US011888170B2

(12) United States Patent
Chen et al.

(10) Patent No.: US 11,888,170 B2
(45) Date of Patent: Jan. 30, 2024

(54) CLAMPING MEMBER AND BATTERY ACCOMMODATING DEVICE

(71) Applicant: WISTRON NEWEB CORPORATION, Hsinchu (TW)

(72) Inventors: Yan-Da Chen, Hsinchu (TW); Ying-Yen Lu, Hsinchu (TW)

(73) Assignee: WISTRON NEWEB CORPORATION, Hsinchu Science Park (TW)

( * ) Notice: Subject to any disclaimer, the term of this patent is extended or adjusted under 35 U.S.C. 154(b) by 281 days.

(21) Appl. No.: 17/496,818

(22) Filed: Oct. 8, 2021

(65) Prior Publication Data
US 2022/0393288 A1    Dec. 8, 2022

(30) Foreign Application Priority Data

Jun. 4, 2021 (TW) ................. 110120325

(51) Int. Cl.
| | |
|---|---|
| *H01M 50/00* | (2021.01) |
| *H01M 50/244* | (2021.01) |
| *H01M 50/202* | (2021.01) |
| *H01M 50/264* | (2021.01) |
| *H01M 50/291* | (2021.01) |

(52) U.S. Cl.
CPC ....... *H01M 50/244* (2021.01); *H01M 50/202* (2021.01); *H01M 50/264* (2021.01); *H01M 50/291* (2021.01)

(58) Field of Classification Search
CPC ............. H01M 50/264; H01M 50/209; H01M 50/202; H01M 50/291; H01M 50/244
See application file for complete search history.

(56) References Cited

U.S. PATENT DOCUMENTS

2016/0226037 A1    8/2016   Yu et al.

FOREIGN PATENT DOCUMENTS

| CN | 208608395 U | * | 3/2019 | ............ H01M 50/00 |
| TW | I540411 B |  | 7/2016 | |

OTHER PUBLICATIONS

Li, An Anti-dropping Battery Wiring Clip, Mar. 2019, See the Abstract. (Year: 2019).*

* cited by examiner

*Primary Examiner* — Cynthia H Kelly
*Assistant Examiner* — Monique M Wills
(74) *Attorney, Agent, or Firm* — McClure, Qualey & Rodack, LLP (57) ABSTRACT

A clamping member and a battery accommodating device are provided. The battery accommodating device includes a body and a clamping member pivotally connected to the body. The clamping member has two arm parts, two protruding parts respectively extending from one side of the two arm parts, and an elastic structure connected to the two arm parts at two ends. When the battery is placed in an accommodating slot of the body, the elastic structure is pressed by the battery, and one end of the battery is clamped between the two protruding parts and the elastic structure. When the two protruding parts are pushed by an external force, the clamping member rotates relative to the body, and the elastic structure pushes up the battery, so as to release the clamped end of the battery.

15 Claims, 13 Drawing Sheets

CLAMPING MEMBER AND BATTERY ACCOMMODATING DEVICE

CROSS-REFERENCE TO RELATED PATENT APPLICATION

This application claims the benefit of priority to Taiwan Patent Application No. 110120325, filed on Jun. 4, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a clamping member and a battery accommodating device, and more particularly, to a clamping member that is easy to operate when being implemented in a battery accommodating device.

BACKGROUND OF THE DISCLOSURE

Battery compartment of common electronic devices such as notebook computers, smart appliance control hub, smart phones, keyboards, mouse, etc. often is designed with a structure that makes removing battery a difficult task for users.

SUMMARY OF THE DISCLOSURE

In response to the above-referenced technical inadequacy, the present disclosure provides a clamping member and a battery accommodating device to effectively improve on the issues associated with removing battery from battery compartment of conventional electronic devices.

In one aspect, the present disclosure provides a clamping member for use in a battery accommodating device having an accommodating slot for accommodating at least one battery. The clamping member has two arm parts, two protruding parts, an elastic structure, and two first pivot structures. The two protruding parts are formed respectively by each of the two arm parts extending from one end toward one side. The elastic structure is connected to another end of each of the two arm parts. A portion of each of the two protruding parts faces toward the elastic structure. Each of the two protruding parts and the elastic structure hold one end of the battery. When the two arm parts move toward each other due to an external force, the elastic structure deforms elastically. The two first pivot structures are respectively disposed on the two arm parts.

In another aspect, the present disclosure provides a battery accommodating device for accommodating a battery. The battery accommodating device includes a clamping member, a body, and two second pivot structures. The clamping member has two arm parts, two protruding parts formed respectively by the two arm parts extending from one end toward one side, an elastic structure connected to another end of the two arm parts, and two first pivot structures respectively disposed on the two arm parts. A portion of each of the two protruding parts is configured to face toward the elastic structure. The two producing parts and the elastic structure together hold one end of the battery. When the two arm parts move toward each other due to an external force, the elastic structure deforms elastically. The body has an accommodating slot for accommodating the battery and an excess slot for accommodating the elastic structure. The excess slot is in spatial communication with the accommodating slot and is formed by a base part of the body receding inward. When the elastic structure is disposed in the excess slot, the elastic structure does not protrude out of the base part. The two second pivot structures are disposed in the accommodating slot of the body and respectively connected to the two first pivot structures. The clamping member is rotatable relative to the body due to another external force.

Therefore, in the battery accommodating device provided by the present disclosure, through pivotally connecting the clamping member and the body and the design of the elastic structure, the two arm parts, and the two protruding parts on the clamping member, the clamping member and the battery accommodating device provided by the present disclosure allow a user to remove the battery from the accommodating slot by simply pushing the two protruding parts to rotate the clamping member relative to the body, which causes the elastic structure to push up the battery, and thus the battery is disengaged from the accommodating slot and can be easily taken out by the user.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 6, an embodiment of the present disclosure provides a battery accommodating device 100 for accommodating a battery B. The battery accommodating device 100 includes a body 1 and a clamping member 2. The battery accommodating device 100 may be implemented in all sorts of electronic devices, and the body 1 of the battery accommodating device 100 may be a portion of the electronic device. For example, the body 1 could be a portion of a housing of the electronic device, wherein the electronic device can be any electronic device with a battery, such as a notebook computer, a smart appliance control hub, a keyboard, a mouse, a smart phone, a smart tablet computer, etc.

The body 1 has an accommodating slot 1A, two retaining structures 11, an excess slot 1B, and two second pivot structures 12. The accommodating slot 1A is used to accommodate the battery B. The excess slot 1B is formed by a base part 13 of the body 1 receding inward and is in spatial communication with the accommodating slot 1A. Since the main purpose of the accommodating slot 1A is to accommodate the battery B, the shape and size of the accommodating slot 1A vary according to the shape and size of the battery B, and it is to be noted that the embodiment shown in the figure is for exemplary purpose only. The excess slot 1B is used to accommodate a portion of the clamping member 2, and so the shape and configuration of the excess slot 1B are determined by and in corresponding to the shape and configuration of the clamping member 2 in the body 1.

The two retaining structures 11 are disposed in the body 1 and located at one end of the accommodating slot 1A. Each retaining structure 11 and the base part 13 together form a retaining notch 11A for accommodating one end of the battery B, and the two retaining notches 11A and the base part 13, together, hold one end of the battery B. In this embodiment, the two retaining structures 11 are formed on a side wall 14 of the body 1 and are spaced apart, but the configuration of the two retaining structures 11 in the body 1 is not limited thereto. The scope of the retaining structure 11 includes any configuration that can be used to constrain one end of the battery B, and therefore the retaining structure 11 is not limited in number, configuration, or size by the embodiments shown in the present disclosure.

Figure 7:
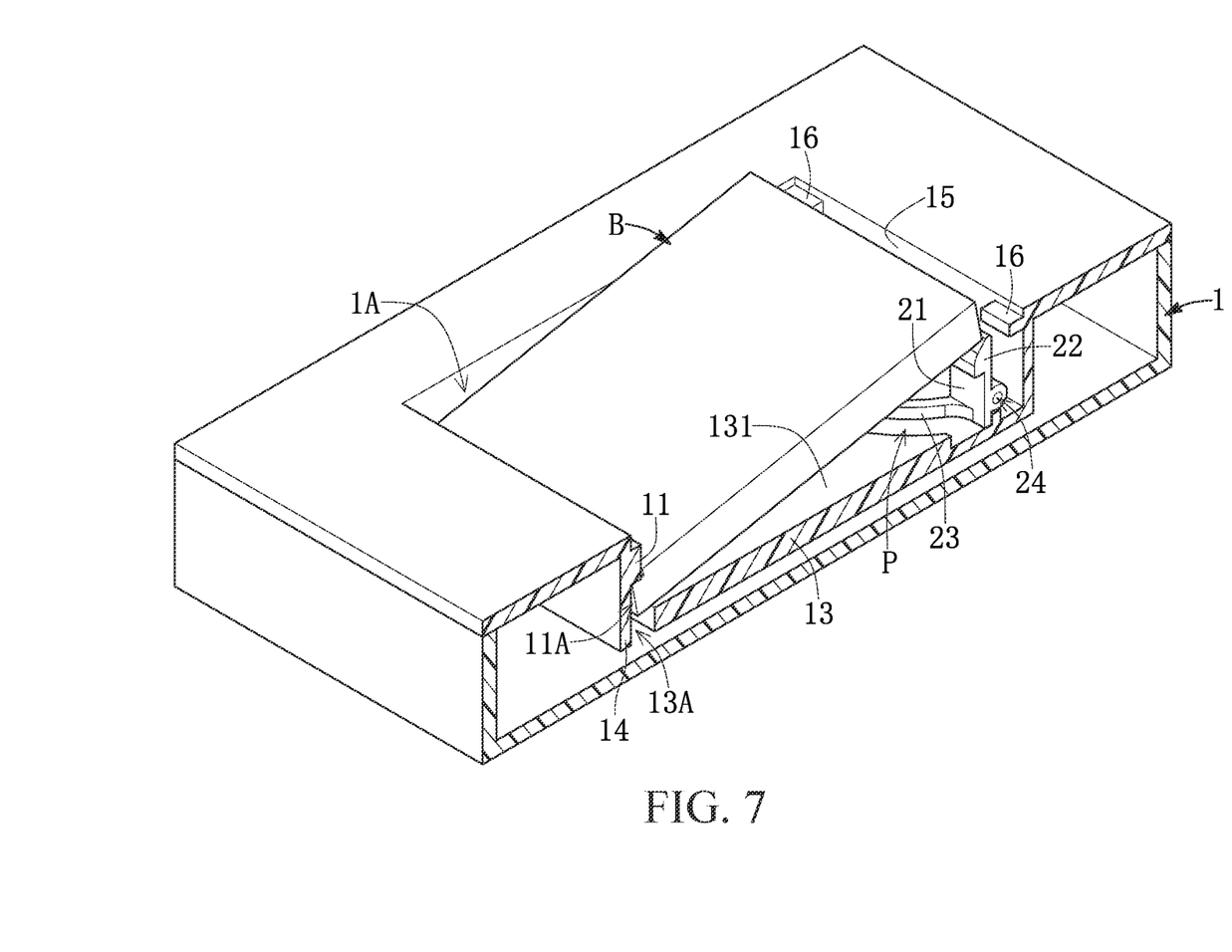
FIG. 7 is a fragmentary cross-sectional perspective view showing a battery being placed in a battery accommodating device according to an embodiment of the present disclosure.

In practical application, the base part 13 of the body 1 can be dented inwardly to form two recesses 13A respectively located below the two retaining structures 11, so users can place one end of the battery B between the two retaining structures 11 and the base part 13 of the body 1 more easily. As shown in FIG. 7, through the design of the two recesses 13A, during the process of disposing one end of the battery B between the retaining structures 11 and the base part 13, a portion of the battery B is correspondingly in the recesses 13A, such that one end of the battery B is disposed in the retaining notches 11A between the two retaining structures 11 and the base part 13 more easily. In this embodiment, the two recesses 13A are located at two corners of the base part 13, but the present disclosure is not limited thereby. In other embodiments, the two recesses 13A can be connected to form a single recess 13A, and each recess 13A is not limited in size and shape by the embodiments shown in the present disclosure.

Figure 1:
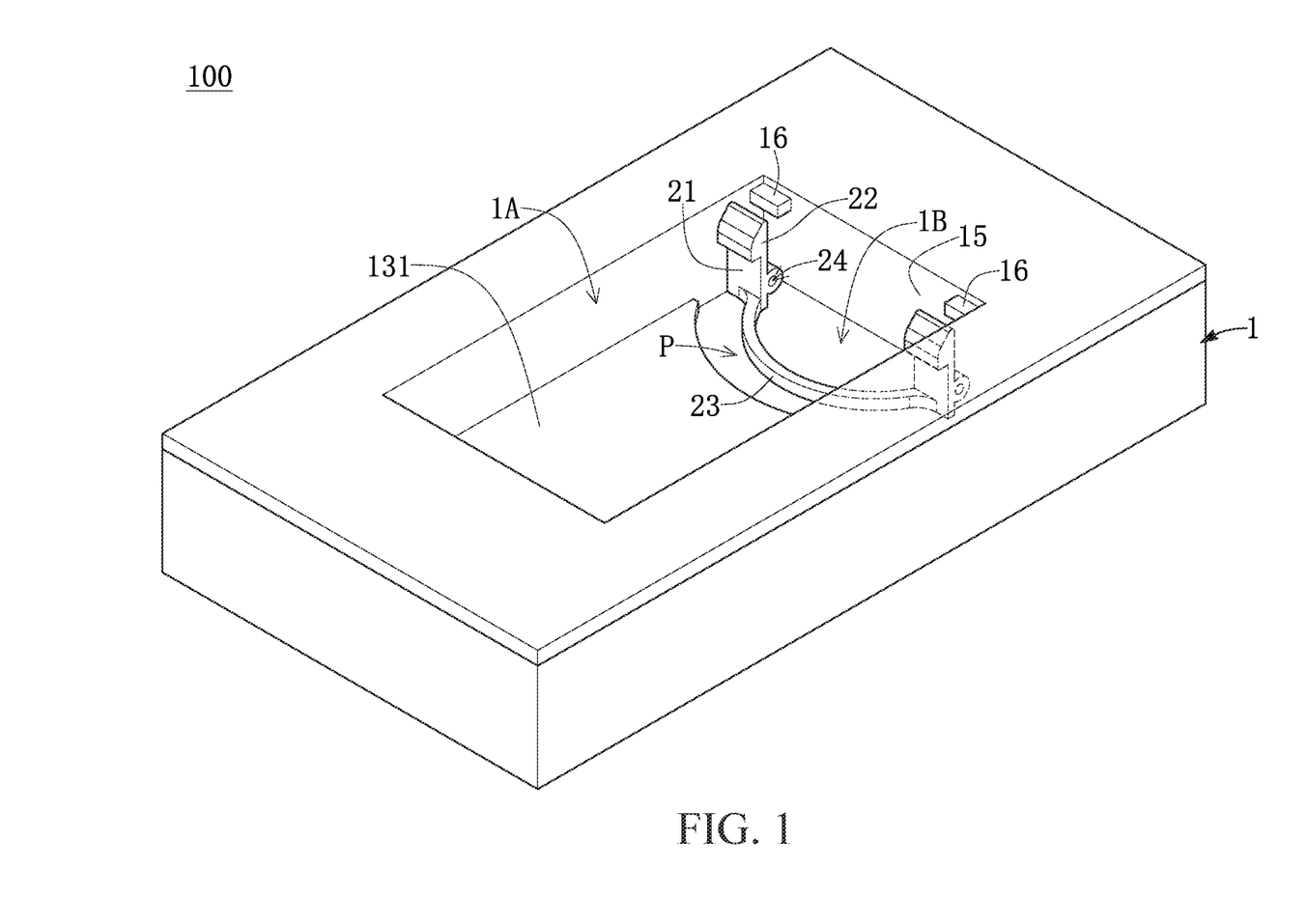
FIG. 1 is a perspective view of a battery accommodating device according to an embodiment of the present disclosure.
Figure 2:
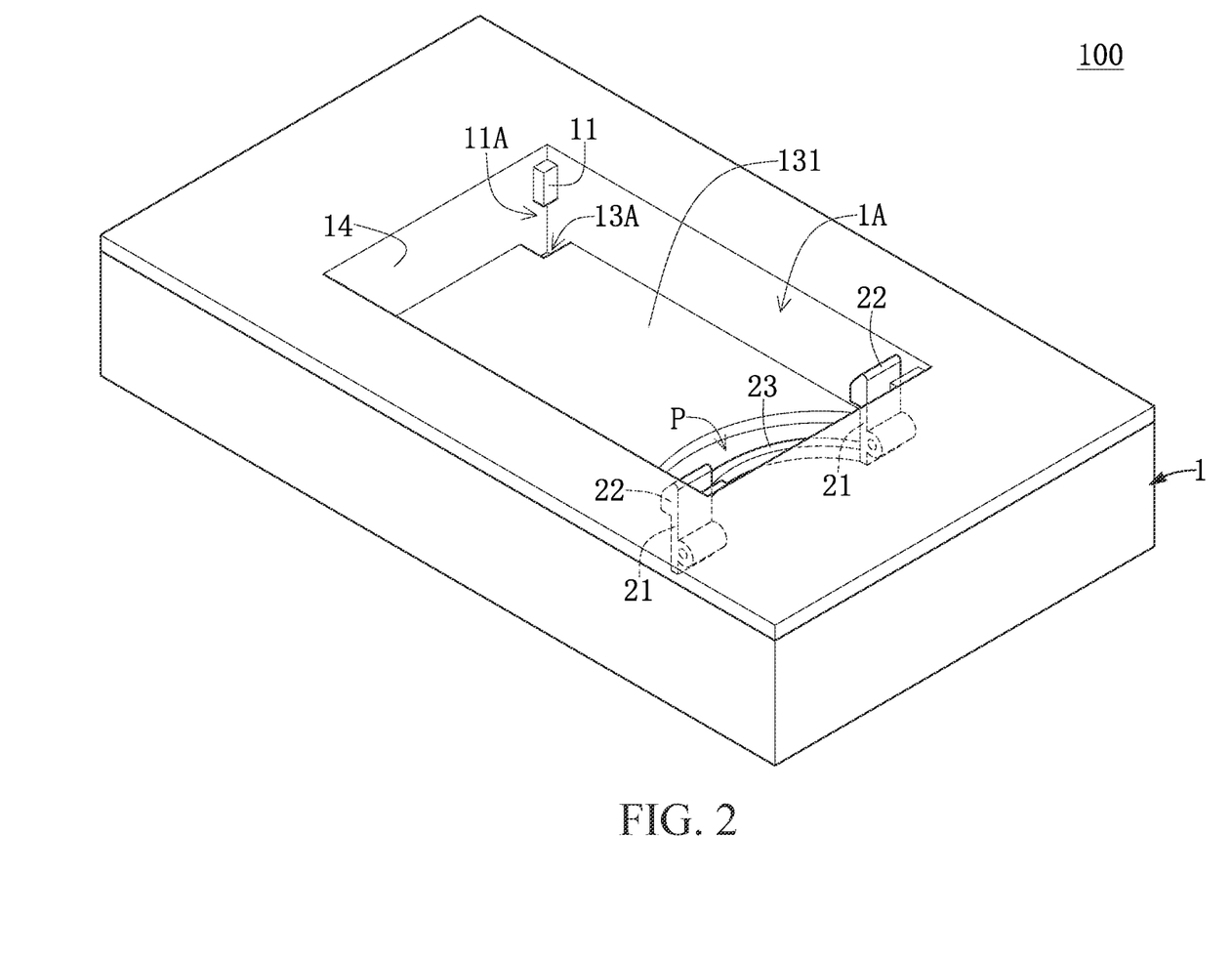
FIG. 2 is a perspective view of a battery accommodating device viewing from a different angle according to an embodiment of the present disclosure.
Figure 3:
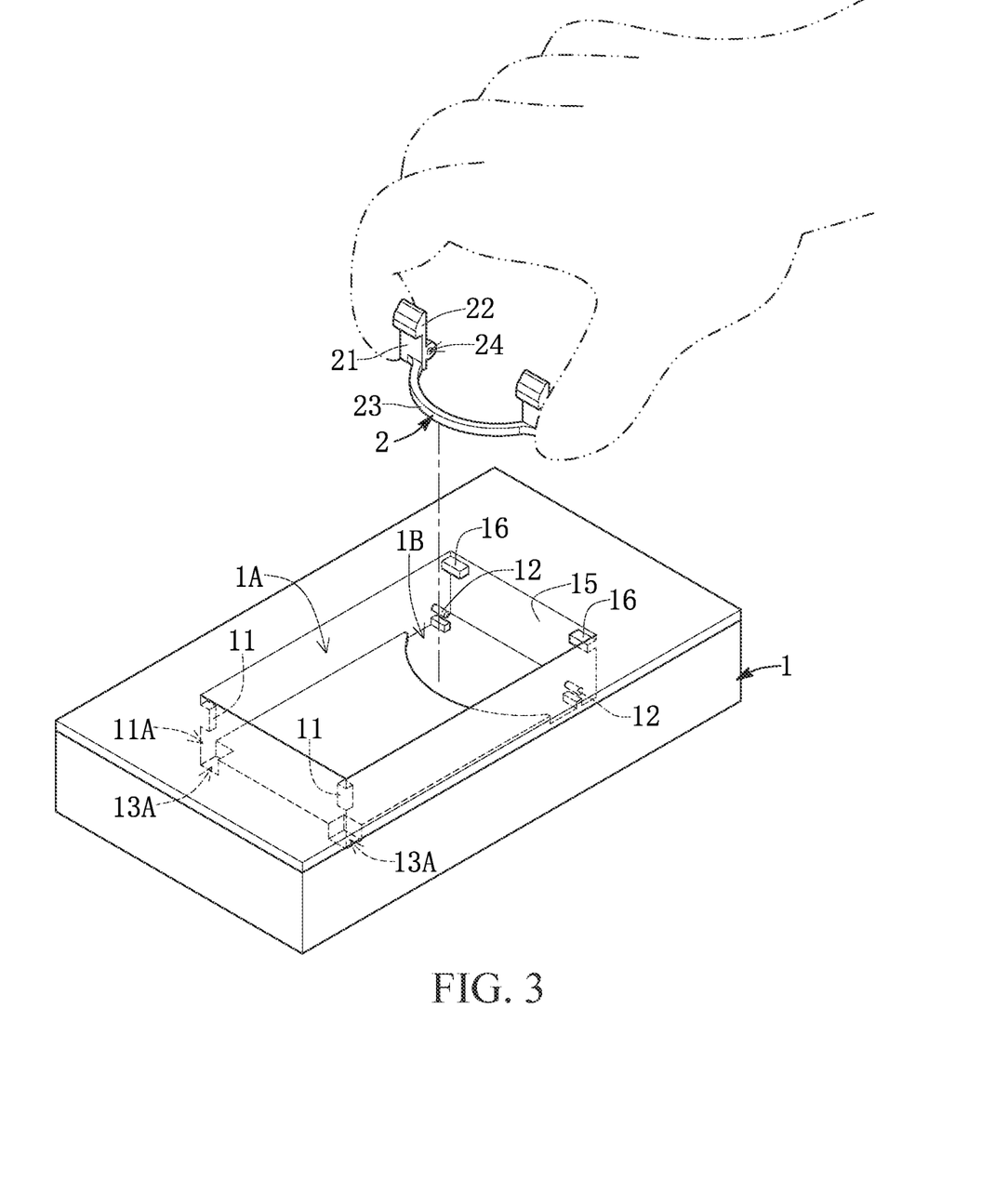
FIG. 3 is an exploded perspective view showing a body and a clamping member of a battery accommodating device according to an embodiment of the present disclosure.

The two second pivot structures 12 are disposed on the body 1 and located in the accommodating slot 1A. The two second pivot structures 12 are disposed at the other end of the accommodating slot 1A opposite to the end of the accommodating slot 1A with the two retaining structures 11. The two second pivot structures 12 are used to pivotally connect with two first pivot structures 24 of the clamping member 2. In this embodiment, each of the two second pivot structures 12 is a cylindrical structure, but the shape of the second pivot structures 12 is not limited thereby. In different embodiments, each of the two second pivot structures 12 can be a cavity, a through hole, or a semi-sphere protrusion.

Figure 6:
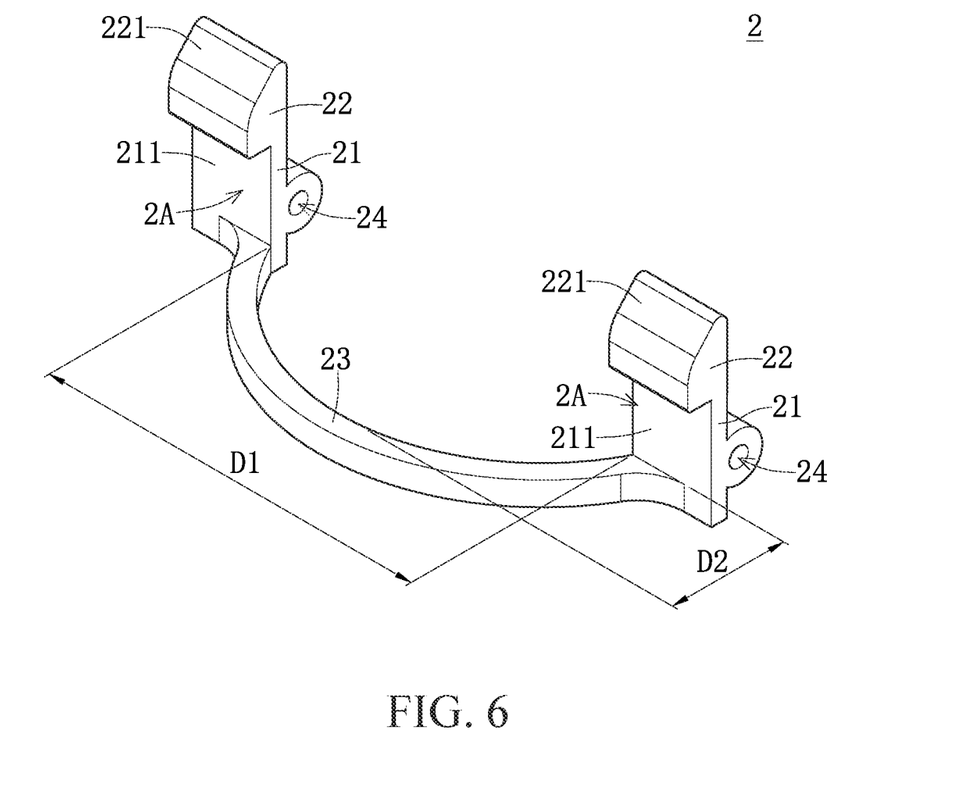
FIG. 6 is a perspective view of a clamping member according to an embodiment of the present disclosure.

The clamping member 2 is detachably fastened in the body 1 and includes two arm parts 21, two protruding parts 22, an elastic structure 23, and two first pivot structures 24. Each of the two arm parts 21 extends from one end toward one side to form one protruding part 22. The size and shape of each arm part 21 vary according to demand, and the embodiments shown in the present disclosure are for exemplary purpose only.

The elastic structure 23 is connected to the other end of each of the two arm parts 21. A portion of each of the two protruding parts 22 is configured to face toward the elastic structure 23. In specific, each arm part 21 is of a rectangular structure having a wide side surface 211. Two ends of the elastic structure 23 are connected respectively to the wide side surface 211 of the two arm parts 21, and each protruding part 22 is formed on the same wide side surface 211 of each arm part 21. The elastic structure 23 is capable to deform elastically when applied with an external force, and the elastically deformed elastic structure 23 can restore/return to its original state when the external force is no longer applied to the elastic structure 23.

Each arm part 21 is disposed with one first pivot structure 24. Each first pivot structure 24 is used to pivotally connect with one second pivot structure 12, and the clamping member is rotatable relative to the body 1 through the pivotally-connected first pivot structures 24 and second pivot structures 12. In this embodiment, each first pivot structure 24 is a through hole while each second pivot structure 12 is a corresponding cylindrical structure, but the shape and size of each first pivot structure 24 and of each second pivot structure 12 is not limited thereby. In different embodiments, each first pivot structure 24 can be a cylindrical structure while each second pivot structure 12 is a corresponding through hole.

Accordingly, the design of the elastic structure 23 makes the two first pivot structures 24 of the clamping member 2 to be more easily engaged with the two second pivot structures 12 of the body 1 when the clamping member 2 is being installed in the accommodating slot 1A. In particular, as shown in FIG. 1 and FIG. 3 to FIG. 5, when a user is installing the clamping structure 2 in the accommodating slot 1A, the user holds the outer sides of the two protruding parts 22 and squeezes the two arm parts 21 to make the elastic structure 23 that is connected to the two arm parts 21 deform elastically and the distance between the two arm parts 21 shortened. As such, the user is able to, in a relatively easier manner, dispose the clamping member 2 in the accommodating slot 1A and engage the two first pivot structures 24 with the two second pivot structures 12. After the two first pivot structures 24 and the two second pivot structures 12 are engaged with each other, the user just stop squeezing the two arm parts 21, and the elastic structure 23 will return to the original unpressed state because of its elastic resiliency. Hence, the two first pivot structures 24 and the two second pivot structures 12 are stably connected to one another. In practice, the width of the accommodating slot 1A is slightly smaller than the width of the clamping 2 when the clamping 2 is not squeezed, so that the elastic structure 23 is slightly compressed by the body 1 when the two first pivot structures 24 of the clamping member 2 are pivotally connected with the two second pivot structures 12 of the body 1, wherein the elastic resilience of the elastic structure 23 enforces each first pivot structure 12 to better connect with the corresponding second pivot structure 24.

Similarly, the user can remove the clamping member 2 from the accommodating slot 1A by squeezing the two arm parts 21, which makes the two arm parts move toward each other, to disengage the pivot connections between the two first pivot structures 24 and the two second pivot structures 12. Hence, the clamping member 2 can be removed easily from the accommodating slot 1A.

As shown in FIG. 1 and FIG. 3 to FIG. 5, when the clamping member 2 is pivotally connected to the two second pivot structures 12 through the two first pivot structures 24, the elastic structure 23 is disposed in the excess slot 1B of the body 1, and the depth of the excess slot 1B is greater than the thickness of the elastic structure 23, so that when the clamping member 2 is pivotally connected to the body 1, the elastic structure 23 does not protrude above/from the base side 131 of the base part 13. Thus, when the battery B is placed in the accommodating slot 1A, the battery B is steadily disposed on the base side 131 of the base part 13.

Moreover, when the clamping member 2 is pivotally connected to the body 1 and disposed in the accommodating slot 1A, there is a space P between where the elastic structure 23 is furthest from the two arm parts 21 and where the excess slot 1B is furthest from a side wall 15 of the accommodating slot 1A. With the space P, the elastic structure 23 that is deformed due to an external force will not interfere with the base part 13 during the installation of the clamping member 2 in the body 1 or the removal of the clamping member 2 from the accommodating slot 1A.

Figure 8:
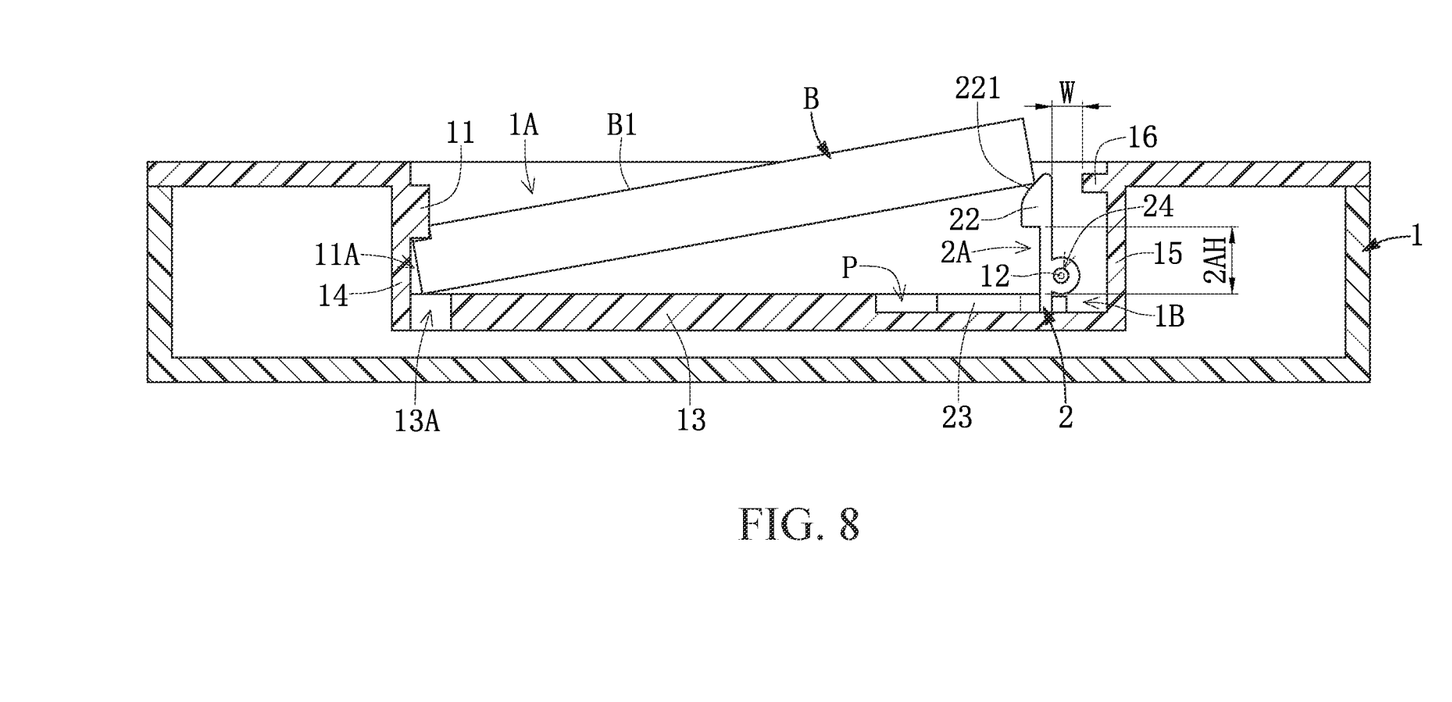
FIG. 8 is a fragmentary cross-sectional view showing a battery being placed in a battery accommodating device according to an embodiment of the present disclosure.

Referring to FIG. 6 to FIG. 11, each protruding part 22 has an inclined surface 221 on the side that is away from the elastic structure 23. A clamping notch 2A is formed by a portion of one protruding part 22, one arm part 21, and a portion of the elastic structure 23, and the two clamping notches 2A of the clamping member 2 are used to hold one end or one portion of the battery B. In one practical application, the height of each clamping notch 2A as shown in FIG. 8 is between 0.5 mm to 1.5 mm, but the height 2AH of the clamping notches 2A is not limited thereto and can vary according to the thickness of the battery B.

Figure 9:
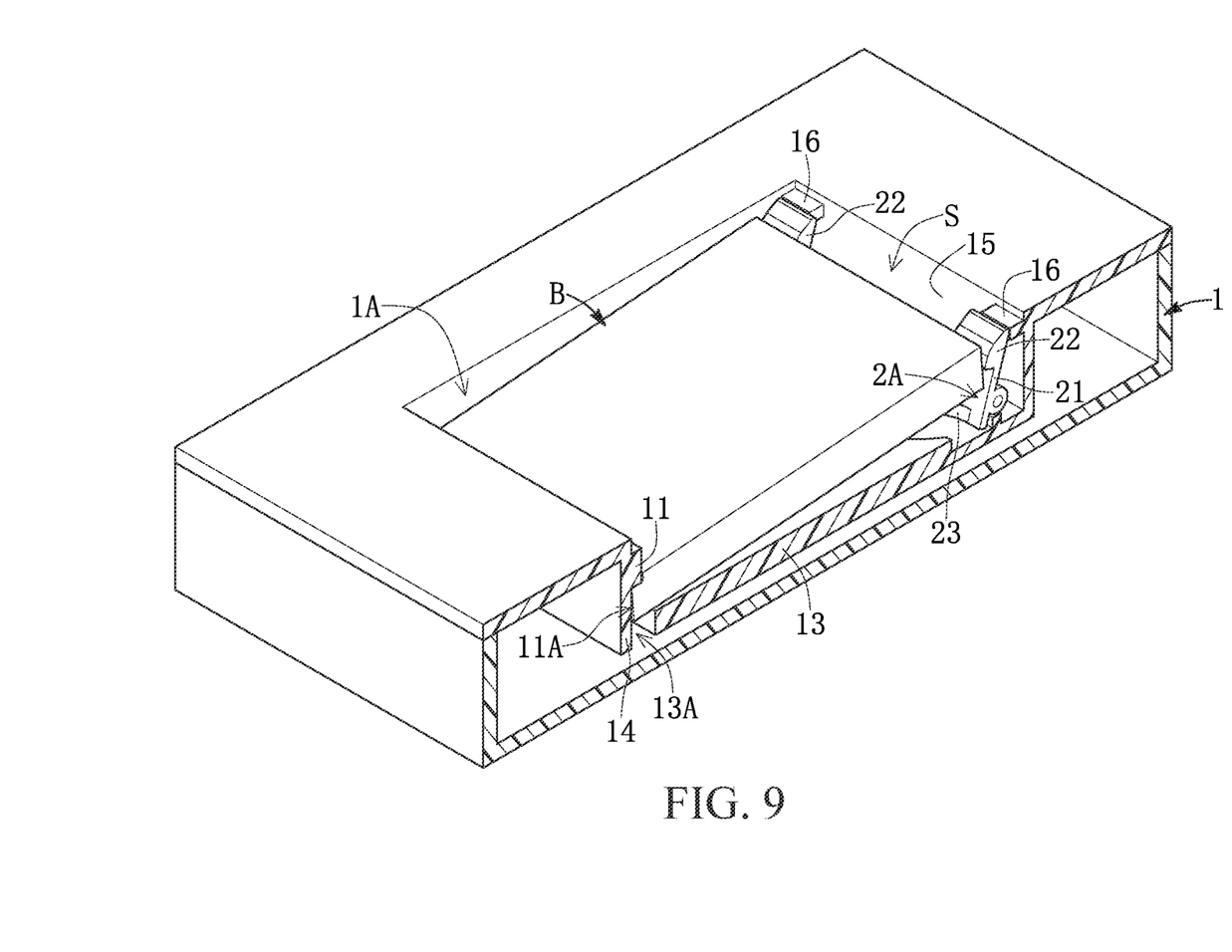
FIG. 9 is a fragmentary cross-sectional perspective view showing a battery being clamped in a battery accommodating device according to an embodiment of the present disclosure.
Figure 10:
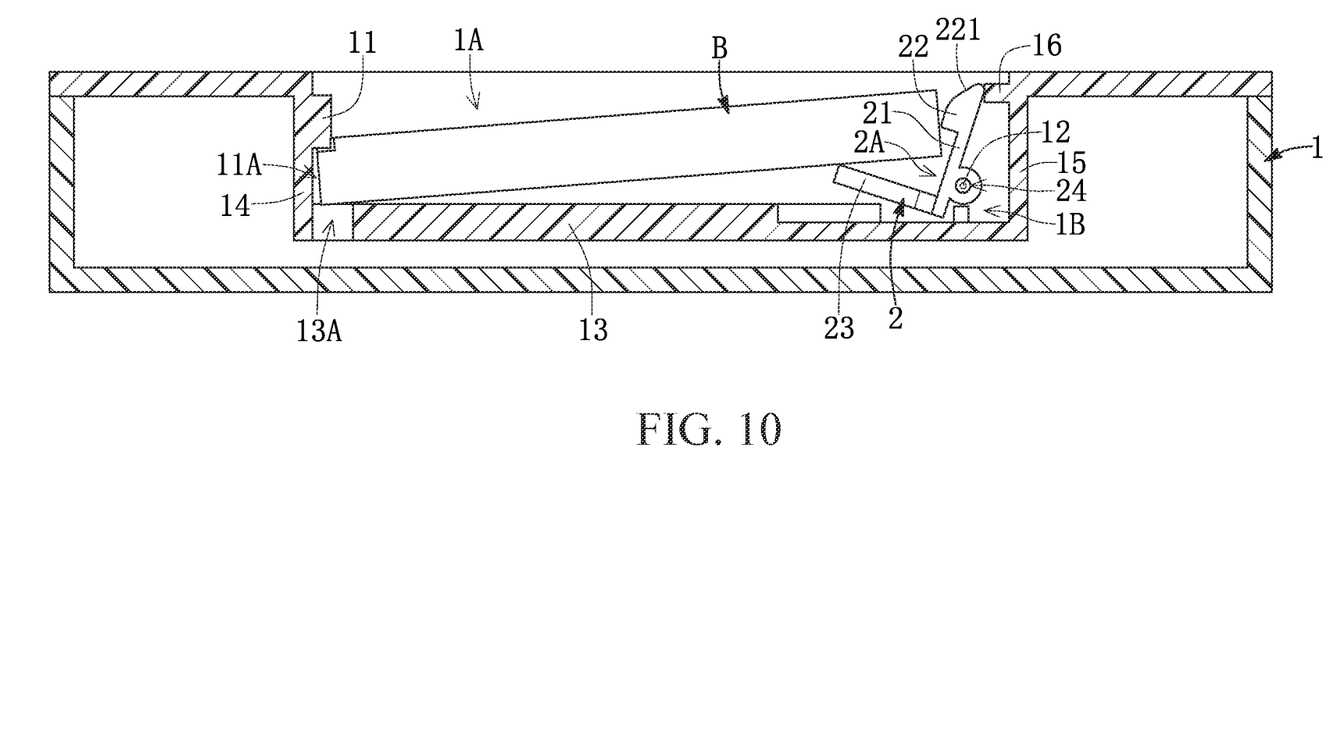
FIG. 10 is a fragmentary cross-sectional view showing a battery being in a battery accommodating device according to an embodiment of the present disclosure.

As shown in FIG. 7 and FIG. 8, when the user wants to place the battery B in the accommodating slot 1A, the user can engage one end of the battery B in the retaining notches 11A between the retaining structures 11 and the base part 13 first and then put the other end of the battery B to lean on the inclined surfaces 221 of the two protruding parts 22. As shown in FIG. 8 to FIG. 10, after one end of the battery B is engaged between the retaining structures 11 and the base part 13 and the other end of the battery B is leaning on the two inclined surfaces 221 of the two protruding parts 22, the user can compress the battery B and move the battery B toward the base part 13, during which the battery B moves along the two inclined surfaces 221 and pushes the clamping member 2 to rotate relative to the body 1 before gradually entering the two clamping notches 2A formed by the two protruding parts 22, the two arm parts 21, and the elastic structure 23.

Figure 11:
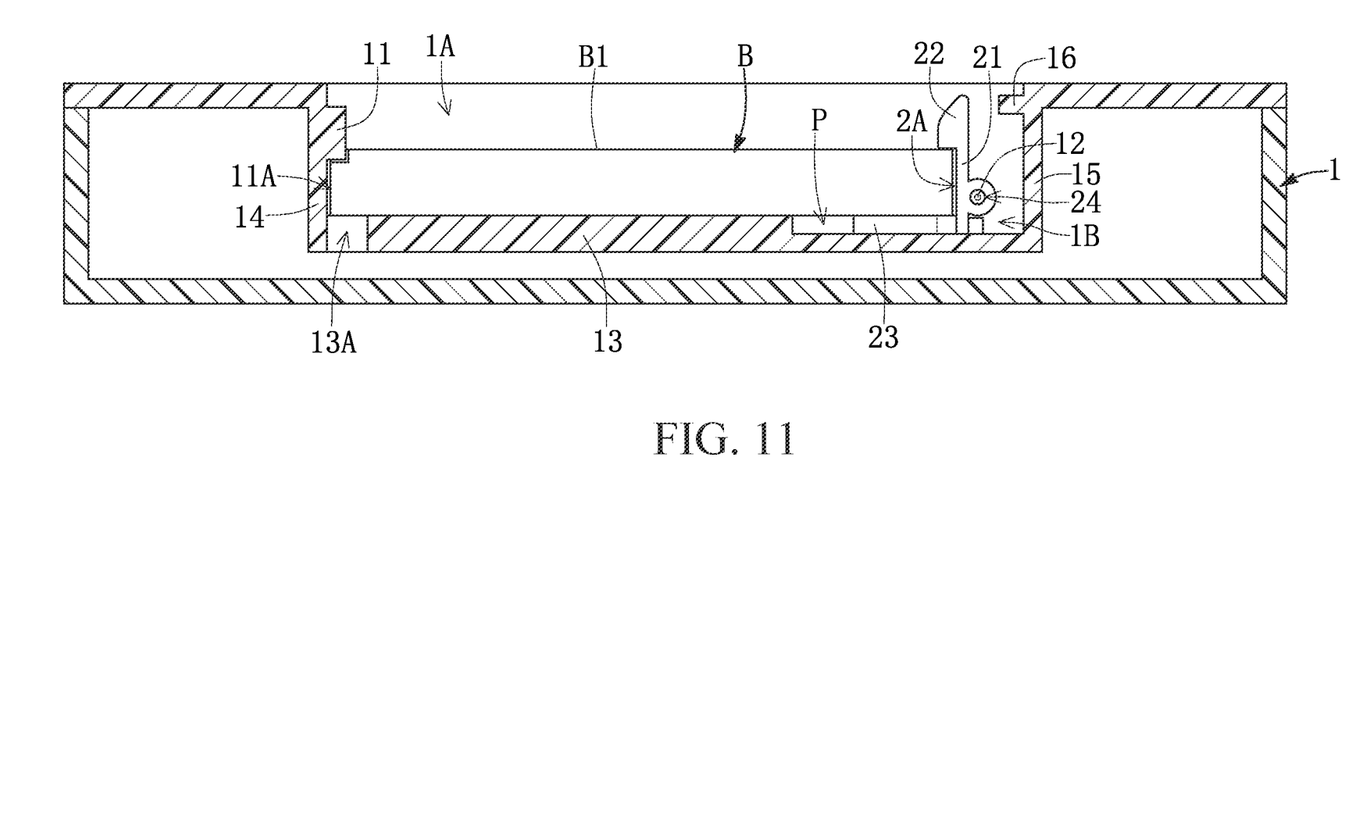
FIG. 11 is a cross-sectional view showing a battery engaged in a battery accommodating device according to an embodiment of the present disclosure.

As shown in FIG. 9 and FIG. 11, when the battery B pushes against the two protruding parts 22, the clamping member 2 rotates relative to the body 1, and a portion of the elastic structure 23 leaves the excess slot 1B. When the battery B is laying on the base part 13, the battery B pushes the elastic structure 23 back down, and the elastic structure 23 returns to the excess slot 1B. In the process of the battery B pushing the elastic structure 23 back into the excess slot 1B, the entire clamping member 2 is driven to rotate relative to the body 1 until the two protruding parts 22 are in engagement with the top side B1 of the battery B.

As shown in FIG. 11, when the battery B is engaged in the accommodating slot 1A, one side of the battery B is laying on the base part 13 of the body 1, the other side of the battery B is confined by the two retaining structures 11 and the two protruding parts 22, the two ends of the battery B are respectively in the retaining notches 11A and the clamping notches 2A, and the battery B is held stably in the accommodating slot 1A by the base part 13, the two retaining structures 11, the two protruding parts 22, and the elastic structure 23.

As shown in FIG. 9 to FIG. 11, to take the battery B out of the accommodating slot 1A, the user just needs to push the two protruding parts 22 in a direction away from the battery B to rotate the clamping member 2 relative to the body 1, and the elastic structure 23 will push up the battery B from the base part 13 of the body 1. During the rotation of the clamping member 2 relative to the body 1, the battery B disengages from the two clamping notches 2A.

As shown in FIG. 1 and FIG. 8 to FIG. 10, the body 1 further includes two block structures 16 connected to the body 1 and located in the accommodating slot 1A adjacent to the two arm parts 21. When the clamping member 2 is rotated relative to the accommodating slot 1A to a predetermined angle due to an external force, the two arm parts 21 lean against the two block structures 16, and the two block structures 16 are used to restrict the rotating angle of the clamping member 2 relative to the accommodating slot 1A.

As shown in FIG. 9, with the design of the two bock structures 16, when the two protruding parts 22 are pushed, causing the two arm parts 21 to lean against the two block structures 16 and the elastic structure 23 to push up the battery B, the user is able to reach the bottom of the battery B by putting fingers through the gap S between the side wall 15 of the body 1 and the battery B and take out the battery B. In a preferred embodiment as shown in FIG. 8 and FIG. 9, the horizontal distance W between each arm part 21 and each block structure 16 is between 2 mm to 5 mm, so it would be easier for the user to put fingers through the gap S and reach the bottom of the battery B.

Figure 4:
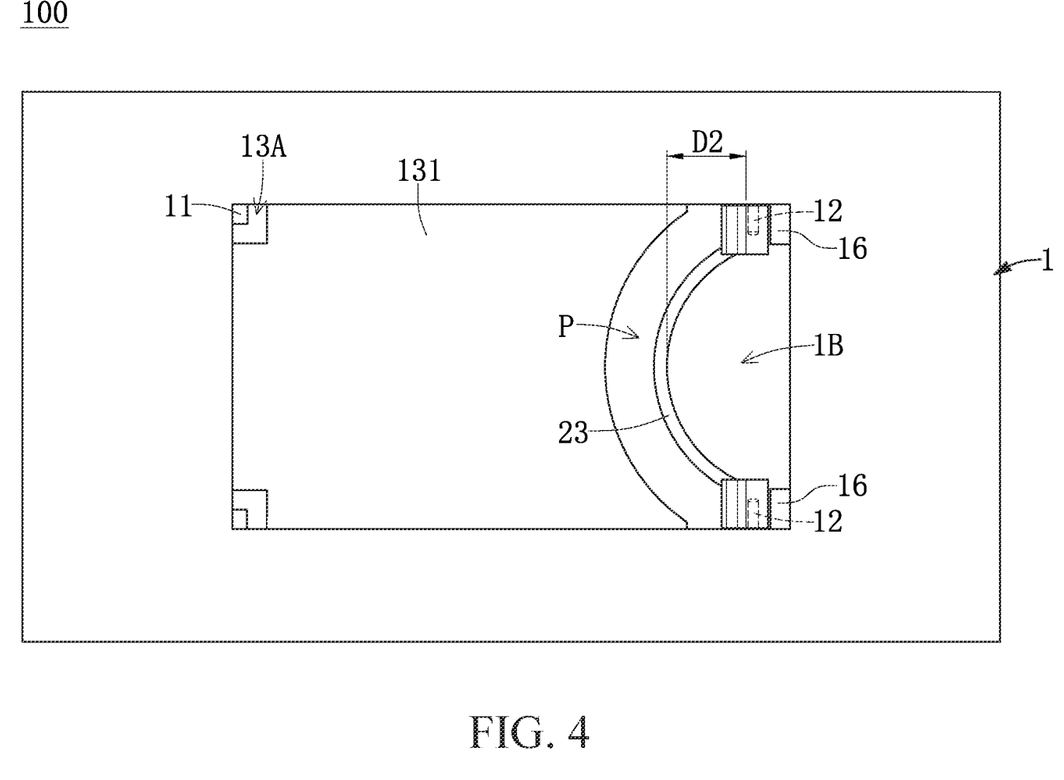
FIG. 4 is a top view of a battery accommodating device according to an embodiment of the present disclosure.
Figure 5:
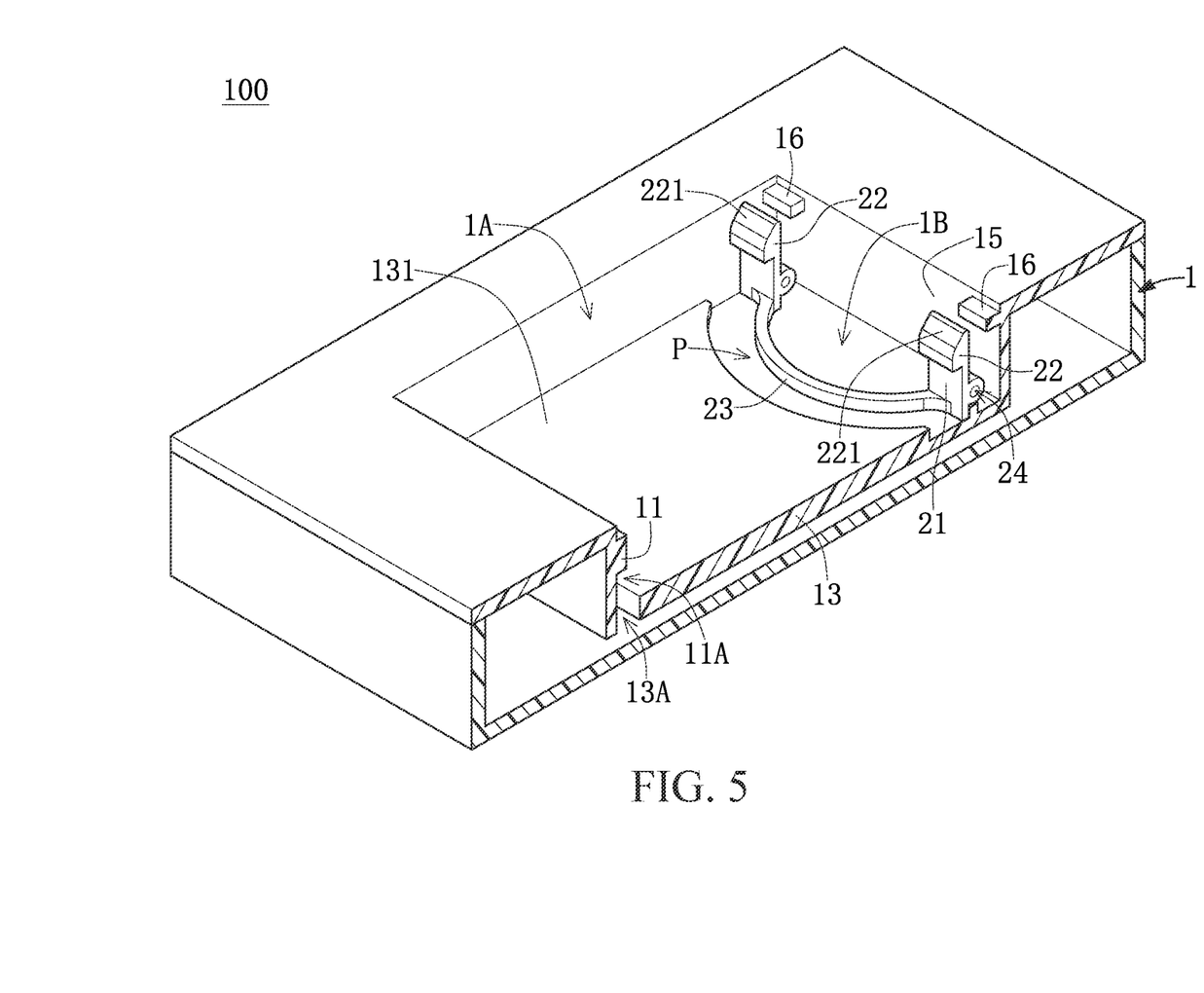
FIG. 5 is a fragmentary cross-sectional view of a battery accommodating device according to an embodiment of the present disclosure.
Figure 12:
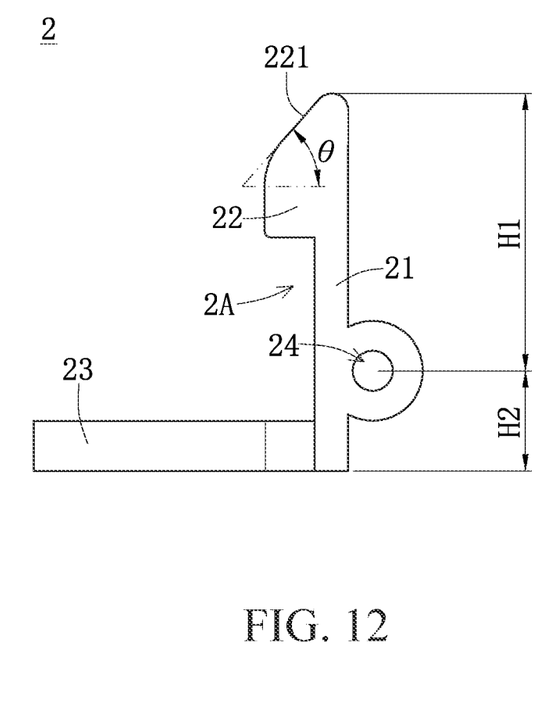
FIG. 12 is a side view of a clamping member according to an embodiment of the present disclosure.

Referring to FIG. 4, FIG. 6, and FIG. 12, if the horizontal distance between two arm parts 21 is defined as a first distance D1 and the largest vertical distance between an inner side of the elastic structure 23 and a horizontal alignment of the two arm parts 21 is defined as a second distance D2, in a preferred embodiment the first distance D1 is 0.25 to 4 times the second distance D2. If the vertical distance between the center of each first pivot structure 24 and one end of the arm part 21 to which is connected is defined as a first vertical distance H1 and the vertical distance between the center of each first pivot structure 24 and the other end of the arm part 21 to which is connected is defined as a second vertical distance H2, the first vertical distance H1 is 1.5 to 4.5 times the second vertical distance H2. An included angle θ between the inclined surface 221 of each protruding part 22 and a horizontal plane is between 45 degrees to 55 degrees. Through the abovementioned design parameters, the user would be able to place the battery B in the accommodating slot 1A or to take the battery B out of the accommodating slot 1A more easily and quickly.

Figure 13:
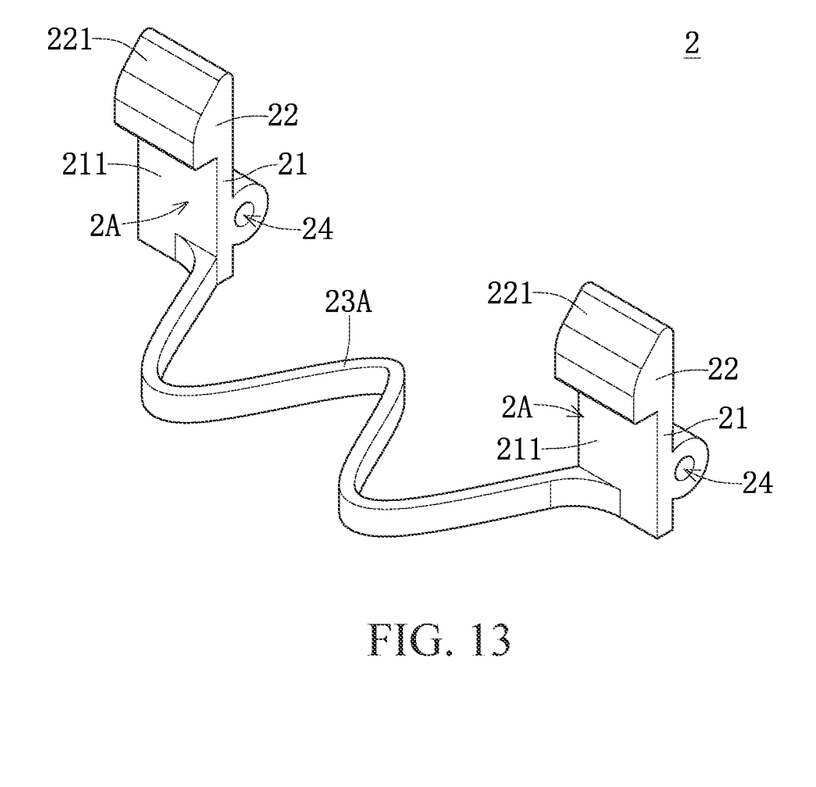
FIG. 13 is a perspective view of a clamping member according to another embodiment of the present disclosure.

Referring to FIG. 13, the clamping member is of another embodiment, and the major difference is that the elastic structure 23A of the clamping member 2 is not an arched structure but a W-shaped structure. However, the shape of the elastic structure 23A is not limited by this or previous embodiments. Any elastic structure 23A that elastically deforms when the outer sides of the two arm parts 21 are squeezed is applicable to the clamping member 2.

It is to be noted that the clamping member 2 of the present disclosure may be manufactured, sold, or practiced solely and not limited to being manufacture, sold, or practiced together with the body.

In conclusion, in the battery accommodating device provided by the present disclosure, the clamping member can allow the user to place the battery in the accommodating slot and take the battery out of the accommodating slot easily and without using other tools.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A clamping member, for use in a battery accommodating device having an accommodating slot for accommodating at least one battery, the clamping member comprising:
   two arm parts spaced apart from each other;
   two protruding parts, wherein each protruding part is formed at one end of each arm part and extends from one side of each arm part;
   an elastic structure, wherein the elastic structure is connected to another end of each of the two arm parts so as to maintain the two arm parts to be spaced apart from each other, and wherein a portion of each protruding part faces toward the elastic structure, the two protruding parts and the elastic structure are configured to hold one end of the battery therebetween, and when the two arm parts move toward each other due to an external force, the elastic structure deforms elastically; and
   two first pivot structures, respectively disposed on the two arm parts.

2. The clamping member according to claim 1, wherein a portion of each of the two protruding parts, each of the two arm parts, and a portion of the elastic structure form a clamping notch with a height of 0.5 mm to 1.5 mm.

3. The clamping member according to claim 1, wherein each of the two protruding parts comprises an inclined surface, and an included angle between the inclined surface and a horizontal plane is between 45 degrees to 55 degrees.

4. The clamping member according to claim 1, wherein the elastic structure is an arched structure.

5. The clamping member according to claim 4, wherein a horizontal distance between the two arm parts is a first distance, a largest vertical distance between an inner side of the elastic structure and a horizontal alignment of the two arm parts is a second distance, and the first distance is 0.25 to 4 times the second distance.

6. The clamping member according to claim 1, wherein, for each first pivot structure and the one arm part which the first pivot structure is disposed on, a vertical distance between a center of the first pivot structure and one end of the arm part is a first vertical distance, a vertical distance between the center of the first pivot structure and another end of the arm part is a second vertical distance, and the first vertical distance is 1.5 to 4.5 times the second vertical distance.

7. A battery accommodating device for accommodating a battery, comprising:
   a clamping member, comprising:
   two arm parts;
   two protruding parts, wherein each protruding part is formed at one end of each arm part and extends from one side of each arm part;
   an elastic structure, connected to another end of each of the two arm parts, wherein a portion of each of the two protruding parts faces toward the elastic structure, the two protruding parts and the elastic structure are configured to hold one end of the battery therebetween, and when the two arm parts move toward each other due to an external force, the elastic structure deforms elastically; and
   two first pivot structures, disposed respectively on the two arm parts;
   a body, comprising:
   an accommodating slot for accommodating the battery; and an excess slot, in spatial communication with the accommodating slot and formed by a base part of the body receding inward, for accommodating the elastic structure;

wherein, when the elastic structure is disposed in the excess slot, the elastic structure does not protrude from the base part; and two second pivot structures, disposed in the accommodating slot of the body and pivotally connected respectively to the two first pivot structures;

wherein the clamping member is rotatable relative to the body due to another external force.

8. The battery accommodating device according to claim 7, further comprising two block structures connected to the body in the accommodating slot and adjacent to the two arm parts, wherein, when the clamping member rotates a predetermined angle relative to the accommodating slot due to the another external force, the two arm parts respectively lean against the two block structures, and the two block structures restrict a rotating angle of the clamping member relative to the accommodating slot.

9. The battery accommodating device according to claim 8, wherein a horizontal distance between each one of the two arm parts and each corresponding one of the two block structures is 2 mm to 5 mm.

10. The battery accommodating device according to claim 7, wherein a portion of each of the two protruding parts, each of the two arm parts, and a portion of the elastic structure form a clamping notch with a height of 0.5 mm to 1.5 mm.

11. The battery accommodating device according to claim 7, wherein each of the two protruding parts comprises an inclined surface, and an included angle between the inclined surface and a horizontal plane is between 45 degrees to 55 degrees.

12. The battery accommodating device according to claim 7, wherein the elastic structure is an arched structure.

13. The battery accommodating device according to claim 12, wherein a horizontal distance between the two arm parts is a first distance, a largest vertical distance between an inner side of the elastic structure and a horizontal alignment of the two arm parts is a second distance, and the first distance is 0.25 to 4 times the second distance.

14. The battery accommodating device according to claim 7, wherein, for each first pivot structure and the one arm part which the first pivot structure is connected to, a vertical distance between a center of the first pivot structure to one end of the arm part is a first vertical distance, a vertical distance between the center of the first pivot structure to another end of the arm part is a second vertical distance, and the first distance is 1.5 to 4.5 times the second vertical distance.

15. The battery accommodating device according to claim 7, further comprising two retaining structures disposed in the body and located at one end of the accommodating slot, wherein the two retaining structures and the base part hold another end of the battery.

\* \* \* \* \*